Nov. 9, 1954  J. YOUHOUSE  2,694,134
HEATING ELEMENT
Filed Oct. 2, 1952
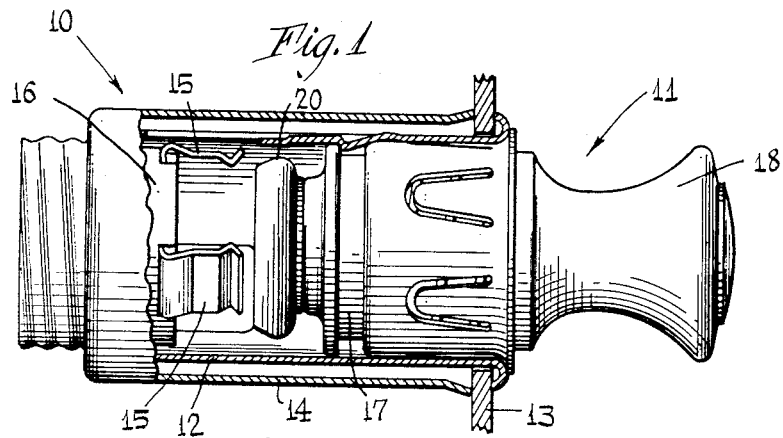
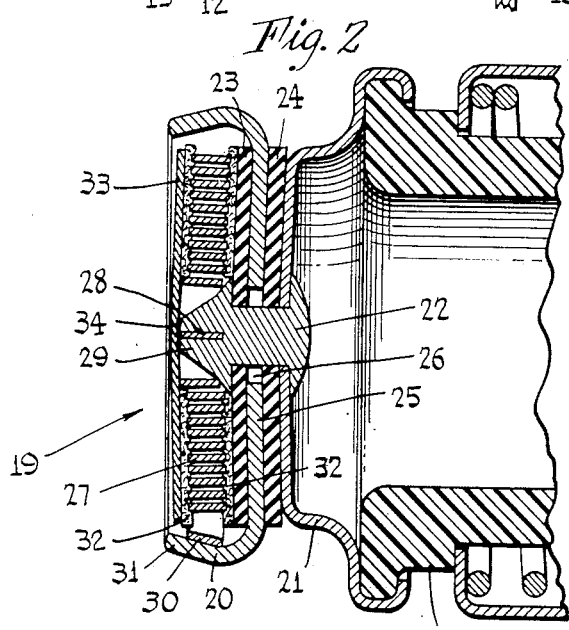
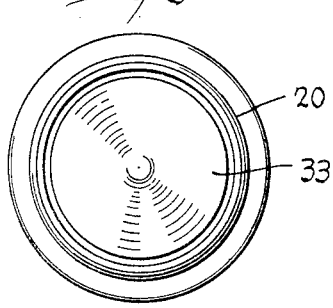
INVENTOR
Joseph Youhouse
BY Johnson and Kline
ATTORNEYS

United States Patent Office 2,694,134
Patented Nov. 9, 1954

2,694,134

HEATING ELEMENT

Joseph Youhouse, Fairfield, Conn., assignor to Automatic Devices Corporation, Bridgeport, Conn., a corporation of Connecticut Application October 2, 1952, Serial No. 312,737

7 Claims. (Cl. 219—32)

This invention relates to heating elements for electrical heaters or igniters such as cigar lighters and the like, particularly cigar lighters as used in automobiles and other automotive conveyances.

Heretofore cigar lighters of the removable plug type as produced and used in automobiles operated on the six-volt electrical system of the automobile, and employed a heating element in the form of a small exposed spiral coil of flat metal ribbon which was carried in a shallow metal cup. The outer end of the coil in these elements was secured to the cup and the inner end fastened to a stud which was insulatedly mounted on the bottom portion of the cup. The high resistivity of the alloy metal which was used in these coils together with the relatively low voltage of the automobile electrical system enabled the ribbon to have a fairly heavy cross section for a given small diameter of cup whereby the coil was self-supporting, with its convolutions spaced apart, and resisted severe usage without serious deformation such as might cause short circuiting or arcing of the coil convolutions.

With the advent of twelve-volt electrical systems in automobiles, and with the use of twenty-four to twenty-eight volt electrical systems in aircraft it was found that the necessary re-design of the spiral heating coil to satisfy the new voltage requirements resulted in a diminution of mechanical strength and rigidity, to such an extent that trouble was experienced in having the coil support itself and maintain the necessary spacing between the convolutions.

The above problem has been solved by the present invention, and an object of the invention is to provide an improved heating element, as for a cigar lighter of the type mentioned above, which is sturdy and rugged in use, small and compact, and which may be operated on high voltages without danger of burnout or failure.

Another object of the invention is to provide an improved heating element as above set forth, which is simple in its construction and economical to fabricate.

Still another object of the invention is to provide an improved heating element in accordance with the above, which is quick to heat to the desired temperature while at the same time resisting burnout to a marked degree if over-energized or energized for too long a period.

A feature of the invention resides in the construction and arrangement of parts whereby the heating element may occupy substantially the same space required by prior heating elements designed for the lower voltages.

Other features and advantages will hereinafter appear.

In the accompanying drawings:

Figure 1 is a side elevational view of a cigar lighter embodying the present invention, portions of the holding device being broken away and shown in section for purposes of clarity.

Fig. 2 is a fragmentary axial sectional view of the removable plug and heating element of the cigar lighter, shown on an enlarged scale.

Fig. 3 is an end or face view of the heating element.

The cigar lighter embodying the present invention, as shown in Fig. 1, comprises a holding device 10 and a removable plug-like igniting unit 11. The holding device 10 includes a shell 12 secured to a mounting panel 13 by a threaded sleeve 14. Within the shell 12 thermostatic contact fingers 15 are provided, mounted on an insulating block 16 fastened at the rear of the holding device.

The igniting unit 11 comprises a body 17 mounting a knob 18 and having at its inner end a novel and improved heating element 19.

In accordance with the present invention the heating element 19 is characterized by a novel, advantageous construction whereby it may be energized from voltage sources substantially greater than the six-volts heretofore supplied in automobiles and the like without danger of burning out, overheating or otherwise failing, said heating element being of substantial and rugged construction, and having a long, useful life.

Referring to Figs. 2 and 3 the heating element 19 comprises a metal cup 20 which is insulatedly secured to a metal mounting cup 21 by a central rivet 22 and insulating washers 23 and 24. The washers 23 and 24 may advantageously be formed of mica or like heat-resistant material. The washer 23 is within the cup 20 and has a sufficiently large diameter to centralize the cup and prevent its contacting the rivet 22. It will be noted that the bottom 25 of the cup 20 has an enlarged aperture 26 to provide adequate clearance around the shank of the rivet 22.

Within the cup 20 I provide a spiral heating coil 27 having a relatively large number of convolutions, the inner end 28 of the heating coil passing through a slot in one end 29 of the rivet 22, and the outer end 30 of the heating coil being secured to a side wall 31 of the cup 20.

On opposite sides of the heating coil 27 I provide insulating washers 32, said washers being preferably formed of a material such as asbestos or the like and having a yieldable structure such that the convolutions of the heating coil will become embedded in the washers as shown when suitable pressure is applied to the latter.

Extending across the mouth of the cup 20 I provide a cover plate or disk 33 which may be formed of suitable metal such as a nickel chromium alloy. The disk 33 is secured at its center to the rivet 22, and this may be advantageously accomplished by a weld 34. Preferably the inner end 28 of the heating coil and the head 29 of the rivet are so arranged that these parts are welded together at the same time that the disk 33 is welded to the head 29 of the rivet.

The disk 33 is thus seen to be closely adjacent and in good heat-exchanging relation with the heating coil 27. Also the disk 33 exerts a pressure against the outermost one of the insulating washers 32, thereby causing the convolutions of the heating coil to become embedded in the washers 32 and preventing accidental dislodgement of the convolutions during the life of the heating element.

I have found that a heating element constructed as above set forth may be formed with a heating coil of very thin ribbon, having a relatively great length and small cross section whereby its overall resistance is correspondingly great. By virtue of the close proximity of the cover disk 33 to the heating coil a rapid transfer of heat will be effected from the coil to the disk, and the latter will have the effect of preventing dangerous overheating or burnout of the coil. Such a heating element may be readily designed for twelve or twenty-four volt circuits, or for even higher voltages, and will have the advantage that the coil convolutions need not be self-supporting and will not sag or become short circuited during normal use of the lighter, nor become clogged with dirt or debris. Accordingly the heating element is rugged and reliable in use over an extended period of time. It also has a very rapid heating rate, causing the disk 33 to become cherry-red in color very quickly. The heating element is simple and economical in construction and lends itself readily to mass production of parts and assemblies.

Variations and modifications may be made within the scope of the claims and portions of the improvements may be used without others.

I claim:

1. A heating element for a cigar lighter or the like, comprising a shallow circular cup; a flat heating coil disposed in said cup; a metal cover disk extending across the mouth of the cup in close proximity to the heating coil, enclosing the latter and receiving heat therefrom; means engaged with the center of the cover disk, securing the cup, heating coil and cover disk together in assembled relation; and means in engagement with the cover disk and bottom of the cup, holding juxtaposed portions of the coil against relative movement.

2. A heating element for a cigar lighter or the like, comprising a shallow circular cup; a stud secured to the bottom of the cup and extending centrally into the cup; a spiral heating coil disposed in said cup around the stud, having one end secured to the stud; a metal cover disk extending across the mouth of the cup in close proximity to the heating coil, enclosing the latter and receiving heat therefrom; and means securing the cover disk to the end of the stud, said means constituting the sole support of the disk.

3. A heating element for a cigar lighter or the like, comprising a coil of flat wire wound in a flat formation with the convolutions broadside to each other; a cover plate overlying the coil, the wire of the coil at substantially all points being disposed edgewise to the plate; a pair of heat-resistant, electrically-insulating sheets on opposite sides of the heating coil, said sheets having portions extending into the interstices of the coil and maintaining the coil convolutions spaced apart; and means securing the coil and cover plate together in closely spaced heat-exchanging relation, said means holding the insulating sheets under pressure in engagement with the coil convolutions and having a member fastened to the center of the cover plate and constituting the sole support of the latter.

4. A heating element for a cigar lighter or the like, comprising a coil of flat wire wound in a flat formation with the convolutions broadside to each other; a cover plate overlying the coil, the wire of the coil at substantially all points being disposed edgewise to the plate; means securing the coil and plate together in closely spaced heat-exchanging relation, said means including a stud fastened to one end of the coil and having one end abutting and welded to the center portion of the cover plate, said stud constituting the sole support of the cover plate.

5. A heating element for a cigar lighter or the like, comprising a stud; a heating coil disposed in a flat formation around and laterally of the end portion of the stud; a cover plate overlying the heating coil and said end portion of the stud; and means securing the cover plate and one end of the heating coil to the said end portion of the stud whereby the plate is supported in close proximity to the heating coil to receive heat therefrom, said means comprising a single weld.

6. A heating element for a cigar lighter or the like, comprising a shallow circular metal cup; a stud insulatedly secured to the bottom of the cup and extending into the latter; a spiral heating coil of metal ribbon disposed in the cup about the said stud, said ribbon being disposed edgewise to the bottom of the cup and said coil having its inner end secured to the stud; a metal cover disk disposed across the mouth of the cup in closely spaced, heat-receiving relation to the heating coil, said disk being secured at its center to said stud for sole support thereby; and insulating means on opposite sides of the heating coil, holding the coil convolutions against relative movement and insulating the convolutions from the bottom of the cup and from the inside of the cover disk.

7. A heating element for a cigar lighter or the like, comprising a shallow circular metal cup; a stud insulatedly secured to the bottom of the cup and extending into the latter; a spiral heating coil disposed in the cup about the said stud, having its inner end secured to the stud; a metal cover disk disposed across the mouth of the cup in closely spaced, heat-receiving relation to the heating coil, said disk being secured to said stud for support thereby and the securement of the inner end of the coil and of the disk to the stud being by a single weld; and insulating means on opposite sides of the heating coil, insulating the convolutions thereof from the bottom of the cup and from the inside of the cover disk, said insulating means comprising disks formed of asbestos, having portions extending between the convolutions of the coil to maintain a predetermined spacing thereof.

References Cited in the file of this patent

UNITED STATES PATENTS

| Number | Name | Date |
|---|---|---|
| 550,686 | McLaughlin | Dec. 3, 1895 |
| 851,403 | Cornelius et al. | Apr. 23, 1907 |
| 904,467 | Wheeler | Nov. 17, 1908 |
| 904,524 | Fisk | Nov. 24, 1908 |
| 972,811 | Burnett | Oct. 18, 1910 |
| 2,062,701 | Cohen | Dec. 1, 1936 |
| 2,554,743 | Jones | May 29, 1951 |